UNITED STATES PATENT OFFICE.

BASHLEY BRITTEN, OF RED HILL, ENGLAND.

IMPROVEMENT IN PROCESSES FOR THE MANUFACTURE OF GLASS.

Specification forming part of Letters Patent No. 157,733, dated December 15, 1874; application filed June 9, 1874.

*To all whom it may concern:*

Be it known that I, BASHLEY BRITTEN, of Red Hill, in the county of Surrey, England, have invented a new or Improved Process for the Manufacture of Glass or vitreous material from the slag of smelting-furnaces; and do hereby declare that the following description forms a full and exact specification of the same, wherein I have set forth the nature and principles of my said improvement, by which my invention may be distinguished from others of a similar class, together with such parts as I claim and desire to secure by Letters Patent—that is to say:

This invention relates to the economical production of glass or of a material of vitreous character, suitable for the manufacture of bottles, slabs, sheets, tiles, utensils, and other ware from the slag produced in the smelting of iron or other ores, the chief object of the invention being to utilize material which is now, in a great measure, wasted, and also to take advantage of the heat at which that material is discharged from the furnace. For this purpose I receive the slag in a state of fusion from the furnace in suitable vessels kept heated, and I mingle therewith, in such proportions as are needed, according to the nature of the slag, or the color or other qualities required in the glass, silicious mineral, cullet, alkali, and metallic oxide, agitating the mass, if necessary, to assist combination.

The materials I prefer to add to the slag consist chiefly of white or pale sand and pulverized soda or potash, the quantity of each depending on the quality of the glass to be made. Ordinary iron slag from blast-furnaces is composed of the same elements as common bottle-glass, but to render it transparent and workable as glass it is necessary to increase the proportion of silica and alkali, which is done by the addition of sand and soda or potash. In order to remove carbonaceous and other impurities during fusion a small quantity of arsenic or other mineral oxide, commonly used in glass-making for the same purpose, may be introduced with the other materials. For making dark green or amber glass, suitable for wine and beer bottles, the quantity of sand to be added to the slag may be about one part by weight of the former to four parts of the latter. Alkali in the cheap form of sulphate of soda can be used with the usual small quantity of ground coke or charcoal mixed with it. The addition of from one to three per cent. of arsenic promotes the fining of the glass. If glass of a lighter color or superior kind to the above mentioned is to be produced, the slag requires to be combined with a larger proportion of silica. The quantity of alkali needed varies with the degree of fusibility or other working qualities required in special modes of manufacture. When containing from eight to ten per cent. of alkali the glass can be worked at a moderate heat. The glass may be rendered softer or easier to manipulate by the introduction, with the other materials, of from five to ten per cent. of oxide of lead or zinc or powdered baryta. For producing various colors the ingredients in common use are employed.

The materials to be incorporated with the slag may be introduced in a pulverulent condition in a stream or streams directed upon the slag, as it is made to flow in a broad shallow current into the converting-vessel or tank, or the materials may be separately heated, and added in a state of fusion to the slag. After boiling for some time in the tank the mixture becomes homogenous, and can be further treated like ordinary glass for manufacture in any desired form.

The vessel or tank in which the fused slag is received to be converted into glass may be heated in a stationary furnace or chamber erected contiguous to the smelting-works, and the molten glass can be withdrawn, as required, or the slag, either with or without the materials to be added, may be run into vessels mounted on wheels, and conveyed in a molten state to works convenient for the farther processes of manufacture. Such portable vessels may be lined or cased with non-conducting materials to prevent loss of heat by radiation; also furnaces may be arranged in the trucks in which they are mounted, for the purpose of providing additional heat.

Having thus described the nature of my in- vention, and the best means I know of for carrying it into practical effect, I hereby declare that I make no general claim to the use of slag from smelting-furnaces as an ingredient in the manufacture of glass; but What I do claim, and desire to be secured by Letters Patent, is—

The method of treating slag hot, as it runs from the smelting-furnace, for the manufacture of glass or vitreous material, by admixture therewith of silicious material and alkali, with or without other materials, substantially as herein described.

In testimony whereof I have signed my name to this specification in the presence of two subscribing witnesses this 26th day of May, 1874.

BASHLEY BRITTEN.

Witnesses:
    JOHN IMRAY,
    JNO. P. M. MILLARD.